(12) United States Patent
Mei et al.

(10) Patent No.: US 7,898,187 B1
(45) Date of Patent: Mar. 1, 2011

(54) CIRCUIT AND METHOD FOR AVERAGE-CURRENT REGULATION OF LIGHT EMITTING DIODES

(75) Inventors: Tawen Mei, Mountain View, CA (US); Thomas Yang, Milpitas, CA (US)

(73) Assignee: National Semiconductor Corporation, Santa Clara, CA (US)

(*) Notice: Subject to any disclaimer, the term of this patent is extended or adjusted under 35 U.S.C. 154(b) by 1054 days.

(21) Appl. No.: 11/703,981

(22) Filed: Feb. 8, 2007

(51) Int. Cl.
*H05B 41/16* (2006.01)

(52) U.S. Cl. .................. 315/247; 315/185 S; 315/224; 315/307; 315/312

(58) Field of Classification Search .................. 315/247, 315/246, 291, 307–311, 312–324, 185 S
See application file for complete search history.

(56) References Cited

U.S. PATENT DOCUMENTS

| | | | |
|---|---|---|---|
| 5,396,188 | A | 3/1995 | Aoki |
| 5,420,499 | A | 5/1995 | DeShazo |
| 5,570,055 | A | 10/1996 | Gilbert |
| 5,877,645 | A | 3/1999 | Comino et al. |
| 6,084,465 | A | 7/2000 | Dasgupta |
| 6,172,492 | B1 | 1/2001 | Pletcher et al. |
| 6,239,654 | B1 | 5/2001 | Yamamoto |
| 6,259,313 | B1 | 7/2001 | Lewicki |
| 6,320,330 | B1 * | 11/2001 | Haavisto et al. ............. 315/291 |
| 6,583,609 | B1 | 6/2003 | Pardoen |
| 6,606,257 | B2 | 8/2003 | Bourdillon |
| 6,636,003 | B2 * | 10/2003 | Rahm et al. ................. 315/179 |
| 6,683,419 | B2 | 1/2004 | Kriparos |
| 6,784,728 | B2 | 8/2004 | Fischer |
| 6,798,152 | B2 | 9/2004 | Rooke et al. |
| 6,844,760 | B2 | 1/2005 | Koharagi et al. |
| 6,871,289 | B2 | 3/2005 | Pullen et al. |
| 7,034,512 | B2 | 4/2006 | Xu et al. |
| 7,058,373 | B2 | 6/2006 | Grigore |
| 7,115,888 | B2 | 10/2006 | Hachiya et al. |
| 7,119,498 | B2 | 10/2006 | Baldwin et al. |
| 7,132,820 | B2 | 11/2006 | Walters et al. |
| 7,132,883 | B2 | 11/2006 | Huijsing et al. |

(Continued)

OTHER PUBLICATIONS

Kenji Tomiyoshi, et al., "System and Method for Providing a Sample and Hold Circuit for Maintaining an Output Voltage of a Constant Current Source Circuit When a Feedback Loop is Disconnected", U.S. Appl. No. 11/784,184, filed Apr. 5, 2007.

(Continued)

*Primary Examiner*—Tuyet Thi Vo

(57) ABSTRACT

A regulator regulates one or more light emitting diodes (LEDs) so as to control an average current through the LEDs. The regulator could include a transistor switch that can couple the LEDs to ground. The regulator could also include circuitry that controls the transistor switch. The circuitry could use a substantially constant reference voltage to regulate the average current through the one or more LEDs. The transistor switch could couple the one or more LEDs to ground through a resistor, and the circuitry could include an error amplifier that compares the reference voltage to a voltage across the resistor. The circuitry could also include a gate driver that can drive a gate of the transistor switch. The error amplifier could be disabled for a period of time when the transistor switch is non-conductive, and the circuitry could include logic for enabling and disabling the error amplifier.

20 Claims, 4 Drawing Sheets

U.S. PATENT DOCUMENTS

| | | | |
|---|---|---|---|
| 7,268,609 | B2 | 9/2007 | van Staveren et al. |
| 7,295,176 | B2 * | 11/2007 | Yang .......................... 345/82 |
| 7,388,359 | B1 | 6/2008 | Ling |
| 7,425,819 | B2 | 9/2008 | Isobe |
| 7,443,209 | B2 | 10/2008 | Chang |
| 7,557,519 | B2 * | 7/2009 | Kranz ....................... 315/291 |
| 7,595,622 | B1 | 9/2009 | Tomiyoshi et al. |
| 2003/0227265 | A1 * | 12/2003 | Biebl ........................ 315/291 |
| 2006/0186827 | A1 * | 8/2006 | Ragonesi et al. ......... 315/185 S |
| 2007/0132439 | A1 | 6/2007 | Tsuzaki |

OTHER PUBLICATIONS

Lawrence Hok-Sun Ling, "System and Method for Providing a Pulsating Current Output Having Ultra Fast Rise and Fall Times", U.S. Appl. No. 11/731,961, filed Apr. 2, 2007.

"PWM LED Driver and Boost, Flyback and SEPIC Controller", Linear Technology Corporation 2005, 24 pages.

"Constant Current LED Driver with Digital and PWM Brightness Control", Texas Instruments, Nov. 2004, 25 pages.

Prathyusha Narra, et al., "An Effective LED Dimming Approach", 2004 IEEE, p. 1671-1676.

T. Suntio et al., "Dynamic Effects of Inductor Current Ripple in Average Current Mode Control", 2001 IEEE, pp. 1259-1264.

Zaohong Yang et al., "DC-To-DC Buck Converters with Novel Current Mode Control", 1999 IEEE, pp. 1158-1164.

Yuri Panov et al., "Adaptive Off-Time Control for Variable-Frequency, Soft-Switched Flyback Converter at Light Loads", IEEE Transactions on Power Electronics, vol. 17, No. 4, Jul. 2002, pp. 596-603.

In-Hwan Oh, "An Analysis of Current Accuracies in Peak and Hysteretic Current Controlled Power LED Drivers", 2008 IEEE, pp. 572-577.

K. Zhou et al., "Qusi-Active Power Factor Correction Circuit for HB LED Driver", 2007 IEEE, pp. 193-197.

"LM3402/LM3402HV 0.5A Constant Current Buck Regulator for Driving High Power LEDs" National Semiconductor, Oct. 2006, 22 pages.

"LM3402 Design Document", National Semiconductor, Sep. 2006, 2 pages.

"LM3404/04HV 1.0A Constant Current Buck Regulator for Driving High Power LEDs", National Semiconductor, Jun. 2007, 24 pages.

"LM3404/04HV 1.0A Constant Current Buck Regulator for Driving High Power LEDs", National Semiconductor, Oct. 2006, 2 pages.

Matthew Reynolds, "LM3402/LM3404 Fast Dimming and True Constant LED Current Evaluation Board", National Semiconductor, Jul. 24, 2008, 18 pages.

Dale R. Eagar, et al., Current Mode Switcher Having Novel Switch Mode Control Topology and Related Method, U.S. Appl. No. 12/198,750, filed Aug. 26, 2008.

Tawen Mei, et al., "Buck Constant Average Current Regulation of Light Emitting Diodes", U.S. Appl. No. 12/657,368, filed Jan. 19, 2010.

* cited by examiner

CIRCUIT AND METHOD FOR AVERAGE-CURRENT REGULATION OF LIGHT EMITTING DIODES

TECHNICAL FIELD

This disclosure is generally directed to regulators for light emitting diodes and more specifically to a circuit and method for average-current regulation of light emitting diodes.

BACKGROUND

Many different devices use light emitting diodes (LEDs), such as flashlights, traffic control signals, flat panel displays, mobile telephone displays, vehicle taillights, and light bulbs. The LEDs are typically current driven devices, meaning the LEDs are controlled by controlling the amount of current provided to the LEDs. Ideally, the current supplied to one or more LEDs is controlled at a minimal cost.

LED control has traditionally been done using floating buck regulators in peak-current mode, meaning the regulators regulate the peak current provided to the LEDs at switch-on times. In contrast, the average current used by the LEDs may be very different from the LEDs' peak current, and loosely controlled parameters (such as inductance and switching frequency) may alter the relation between the LEDs' average current and peak current. As a result, it is often not possible to predict or control the LEDs' average current based on peak current levels.

Another technique that has been devised for controlling LEDs involves modulating a reference voltage used to regulate the LEDs. However, this technique often requires using a matching resistor-capacitor (RC) filter to remove alternating current (AC) modulation. The RC filter may introduce delay into the control loop, and it may limit the range of switching frequencies that can be achieved. For example, at too low of a switching frequency, the RC filter may be unable to remove the AC components. At a higher frequency, the delay introduced by the RC filter may impede the bandwidth that can otherwise be achieved.

FIGS. 1 and 2 illustrate conventional regulators for regulating LEDs. As shown in FIG. 1, a circuit 100 includes a conventional floating buck converter 102, a voltage comparator 104, a leading edge blanking unit 106, and pulse width modulation (PWM) control logic 108. The converter 102 includes one or more LEDs 110 coupled in series with one another. The LEDs 110 are also coupled in parallel with a capacitor 112 and a diode 114. An inductor 116 is coupled between the LEDs 110 and the diode 114. The diode 114 and the inductor 116 are coupled to a transistor 118, which is also coupled to a resistor 120. The gate of the transistor 118 is coupled to a gate driver 122.

The signal provided by the gate driver 122 to the transistor 118 is based on the operation of the voltage comparator 104, the leading edge blanking unit 106, and the PWM control logic 108. The voltage comparator 104 compares an output of the leading edge blanking unit 106 to a reference voltage $V_{REF}$. An output of the voltage comparator 104 is provided to the PWM control logic 108, which includes two pulse generators 124-126 and three NOR gates 128-132. Each of the pulse generators 124-126 receives an input signal having approximately a 50% duty cycle. The pulse generators 124-126 generate signals having pulses with approximately the same switching period as the input signal. However, the pulses generated by the pulse generator 124 are shorter than the pulses generated by the pulse generator 126. The outputs of the voltage regulator 104 and the pulse generators 124-126 are received by the NOR gates 128-132. The NOR gate 132 produces an output signal that is provided to the gate driver 122 for use in controlling the transistor 118, where the output signal produced by the NOR gate 132 has a desired duty cycle.

The leading edge blanking unit 106 receives the voltage produced between the transistor 118 and the resistor 120. The leading edge blanking unit 106 removes a spike in that voltage at the beginning of each switching period to provide a smoother input to the voltage comparator 104. The spike could represent switching noise generated by switching the transistor 118.

In this conventional circuit 100, no information regarding the current through the inductor 116 is available when the transistor 118 is switched off. As a result, a sensed voltage SEN (the voltage across the resistor 120) is not related to the average current through the inductor 116. A peak-current regulator (formed from components 104-108) turns the transistor 118 off when the sensed voltage SEN is above the reference voltage $V_{REF}$. However, this is very different from regulating the average current through the LEDs 110.

Another convention approach is shown in FIG. 2, where a circuit 200 modulates a reference voltage $V_{REF}$ used to regulate the LEDs 110. The circuit 200 includes the floating buck converter 102, voltage comparator 104, and PWM control logic 108 described above. The circuit 200 also includes an operational transconductance amplifier 202, transistors 204-210, a voltage source 212, resistors 214-218, capacitors 220-224, and an inverter 226. The gate of the transistor 204 is coupled to an input of the inverter 226, the gate of the transistor 208, and the output of the gate driver 122. The transistor 204 is also coupled between the transistor 118 and the resistor 120. The gate of the transistor 206 is coupled to the output of the inverter 226.

In this circuit 200, the signal generated between the transistors 208-210 is generally a square wave with a maximum voltage of $V_{REF}$. The signal generated between the transistors 204-206 has peaks that are greater than the voltage $V_{REF}$. The transistors 204-206, resistor 214, and capacitor 220 produce a signal supplied to one input of the operational transconductance amplifier 202. The transistors 208-210, voltage source 212, resistor 216, capacitor 222, and inverter 226 produce a signal supplied to another input of the operational transconductance amplifier 202. Both inputs to the operational transconductance amplifier 202 are generally triangular waves. The output of the operational transconductance amplifier 202 is supplied to the resistor 218 and capacitor 224, as well as to the voltage comparator 104. The other input to the voltage comparator 104 is a sawtooth voltage signal having approximately the same switching period as the signals in the PWM control logic 108.

In this approach, the reference voltage $V_{REF}$ is switched on and off and may have the exact same duty factor as the transistor 118. Several RC filters with a time constant much greater than the switching period are used to remove AC components in order to extract the average current and voltage. This, however, leads to large space requirements and limited switching frequency ranges.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 3 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 3:
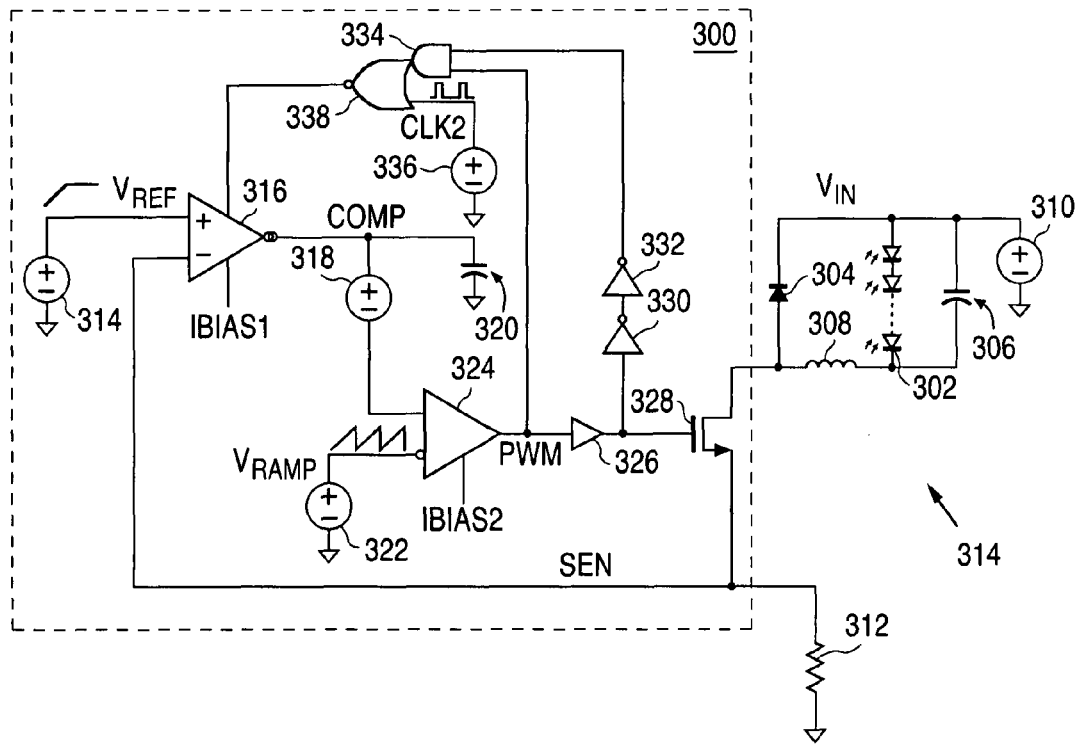
FIG. 3 illustrates an example regulator for regulating LEDs according to this disclosure.
Figure 3:
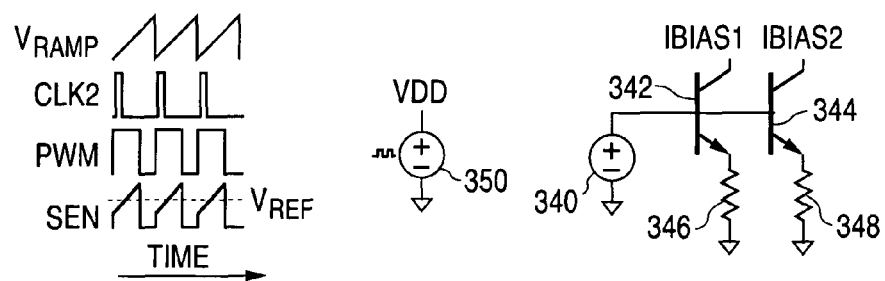

FIG. 3 illustrates an example regulator 300 for regulating LEDs according to this disclosure. The embodiment of the regulator 300 shown in FIG. 3 is for illustration only. Other embodiments of the regulator 300 could be used without departing from the scope of this disclosure.

As shown in FIG. 3, the regulator 300 is used to drive one or more LEDs 302, which are coupled in parallel with a diode 304 and a capacitor 306. An inductor 308 is coupled between the LEDs 302 and the diode 304. A voltage source 310 provides the input voltage $V_{IN}$ for the LEDs 302. In particular embodiments, the capacitor 306 represents a 10 µF capacitor, the inductor 308 represents a 10 µH inductor, and the voltage source 310 represents a 12 VDC source.

In this example embodiment, the regulator 300 regulates the illumination of the LEDs 302 by controlling whether there is a path from the LEDs 302 to ground via a resistor 312. In other words, the regulator 300 may act as a switch. When the regulator 300 conducts, a path exists from the LEDs 302 to ground through the resistor 312. When the regulator 300 does not conduct, no path exists from the LEDs 302 to ground through the resistor 312. In this way, the regulator 300 can control the illumination produced by the LEDs 302. In particular embodiments, the resistor 312 represents a 1Ω resistor.

In this example, the regulator 300 includes a voltage source 314, which produces a reference voltage $V_{REF}$. The reference voltage $V_{REF}$ may ramp up during an initial period before reaching a desired value. In particular embodiments, the voltage source 314 represents a 1V source.

The reference voltage $V_{REF}$ is provided as one input to an error amplifier 316. The error amplifier 316 compares the reference voltage $V_{REF}$ against a sensed voltage (SEN). The sensed voltage SEN represents the voltage across the resistor 312. The error amplifier 316 generates a current based on whether the reference voltage $V_{REF}$ exceeds the sensed voltage SEN. The output of the error amplifier 316 is coupled to a voltage source 318 and a capacitor 320. In particular embodiments, the voltage source 318 represents a 500 mV source, and the capacitor 320 represents a 10 pF capacitor.

The voltage source 318 and a voltage source 322 are coupled as inputs to a PWM comparator 324. The voltage source 322 generates a sawtooth voltage $V_{RAMP}$. The voltage $V_{RAMP}$ is inverted by the PWM comparator 324 or an external inverter. In particular embodiments, the voltage source 322 represents a 2V source.

The PWM comparator 324 compares its inputs and generates an output PWM based on the comparison. The PWM comparator 324 provides the desired pulse width modulation in the driving of the LEDs 302. The output of the PWM comparator 324 is provided to a gate driver 326, which drives the gate of a transistor 328. The transistor 328 acts as a switch to either allow or block a path from the LEDs 302 to ground via the resistor 312.

In this example, the regulator 300 also includes two inverters 330-332, an AND gate 334, a voltage source 336, and a NOR gate 338. The inverters 330-332 operate to detect if the transistor 328 is turned on or off by sensing the transistor's gate voltage. The AND gate 334 performs a logical AND operation of the output of the inverter 332 and the PWM signal. The output of the AND gate 334 is provided to the NOR gate 338, along with a clock signal CLK2 from the voltage source 336. In particular embodiments, the voltage source 336 represents a 5V source. The output of the NOR gate 338 enables or disables the error amplifier 316.

In one aspect of operation, the reference voltage $V_{REF}$ can be kept approximately constant, and the error amplifier 316 (when turned on) may continuously compare the reference voltage $V_{REF}$ and the sensed voltage SEN. However, the error amplifier 316 can be turned on only when there is an active sensed voltage SEN. When the transistor 328 is off or non-conductive, the error amplifier 316 can be turned off as well. The output of the error amplifier 316, which controls the duty factor of the PWM signal, may be held constant when the error amplifier 316 is off. Turning the error amplifier 316 off may lower power consumption of the regulator 300. When the transistor 328 is on or conductive, the error amplifier 316 is on and integrates the error voltage (SEN−$V_{REF}$) over the period when the transistor 328 is on.

The error amplifier 316 can be turned on and off by controlling its supply using the inverters 330-332, AND gate 334, voltage source 336, and NOR gate 338. For example, the output of the NOR gate 338 can turn the error amplifier 316 on just after the transistor 328 becomes conductive. The output of the NOR gate 338 can also turn the error amplifier 316 off before the transistor 328 becomes non-conductive. This may help to reduce or eliminate the possibility of noise affecting the output of the error amplifier 316. This noise could, for example, come from switching the transistor 328 or from changing the state of the gate driver 326. In this example, the clock signal CLK2 is used to routinely turn the error amplifier 316 on even when the duty cycle of PWM is zero. This can be done to prevent the error amplifier 316 from being turned completely off for an extended period of time.

In a steady state, any change in the charge of the capacitor 320 may be zero over each cycle. If the current in the inductor 308 is linear, the point where SEN=$V_{REF}$ may represent the midpoint of the up-ramp (and the down-ramp) of the inductor current. This is also the average inductor current. As a result, the duration that the output of the error amplifier 316 is positive may equal the duration that the output of the error amplifier 316 is negative.

Figure 1:
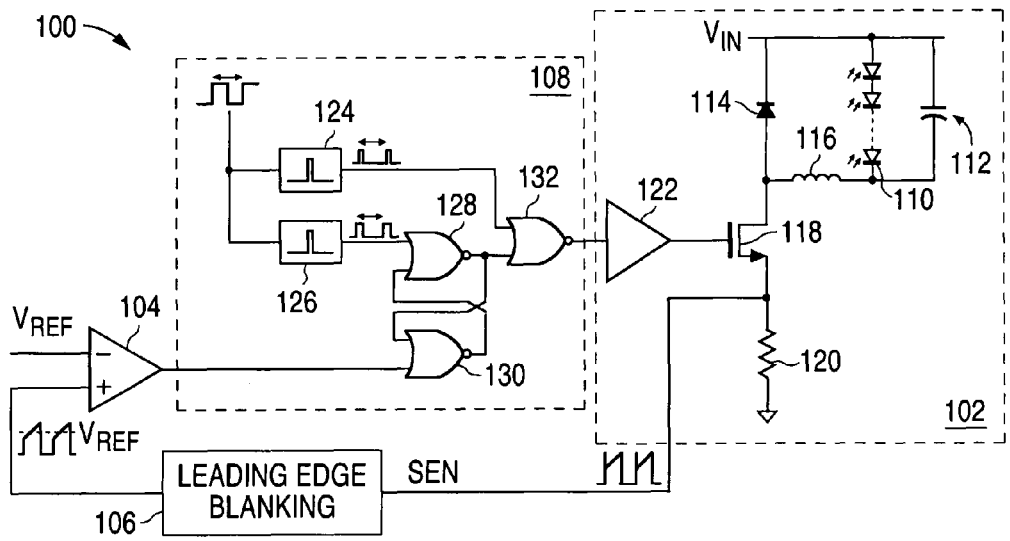
FIGS. 1 and 2 illustrate conventional regulators for regulating LEDs.

As noted above, noise can be reduced in the output of the error amplifier 316. The regulator 300 can also reduce noise in other ways. For example, noise may have no net direct current (DC) term and may integrate to zero over time. Because of this, it may not change the average current through the inductor 308. Conventional techniques require elaborate blanking schemes to minimize the effects of switching noise when switching a transistor on and off (see the description of FIG. 1 above). The regulator 300 need not use elaborate blanking schemes to minimize the effects of switching noise.

As shown in FIG. 3, the error amplifier 316 and the PWM comparator 324 operate using bias currents BIAS1 and BIAS2. FIG. 3 illustrates one example mechanism for generating the bias currents. In this example, a voltage source 340 is coupled to the bases of two transistors 342-344. The transistor 342 is coupled in series with a resistor 346, and the transistor 344 is coupled in series with a resistor 348. The bias currents are generated at the collectors of the transistors 342-344. In particular embodiments, the voltage source 340 represents a 1.25 VDC source, the transistors 342-344 represent NPN bipolar transistors, and the resistors 346-348 represent 54.8 kΩ resistors. In addition, various components in the regulator 300 (such as the error amplifier 316 and the logic gates) may derive their operating power from a supply voltage VDD provided by a voltage source 350. In particular embodiments, the voltage source 350 represents a 5V source. The relationships between the various signals generated in the regulator 300 are also shown in FIG. 3.

Each of the components of the regulator 300 could be implemented in any suitable hardware, software, firmware, or combination thereof. For example, the error amplifier 316 could be implemented in hardware as a difference amplifier or as a comparator and a charge pump. Also, the regulator 300 as a whole could be implemented using digital circuitry, software, or any other suitable technology.

The regulator 300 may provide various advantages depending on its implementation. For example, the regulator 300 may require no RC filters to operate, and the associated limitation in switching frequency may not be present in the regulator 300. Also, the regulator 300 may be smaller than conventional LED regulators, reducing or minimizing the size and cost of the regulator 300. The smaller area occupied by the regulator 300 may allow the regulator 300 to be packaged in a smaller form factor. In addition, the regulator 300 may require no additional input or output pins compared to convention regulators. Other or additional benefits could also be obtained with the regulator 300, depending on the specific implementation used.

Although FIG. 3 illustrates one example of a regulator 300 for regulating LEDs, various changes may be made to FIG. 3. For example, the error amplifier 316 could be kept on at all times, and the output of the error amplifier 316 could be switched into and out of the circuit using a transistor switch. As another example, any other arrangement of logic gates or other structures that provide part or all of the functionality of FIG. 3 could be used.

Figure 4:
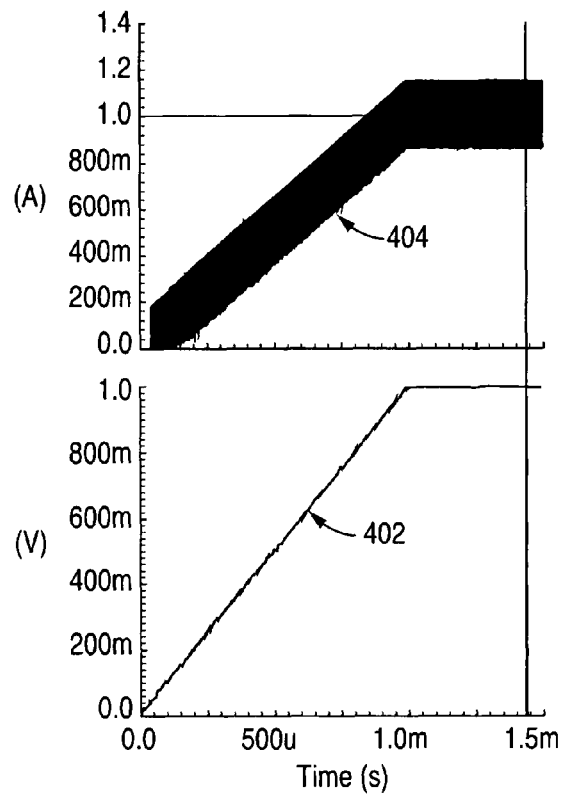
FIGS. 4 through 6 illustrate example operating characteristics of the regulator shown in FIG. 3.
Figure 2:
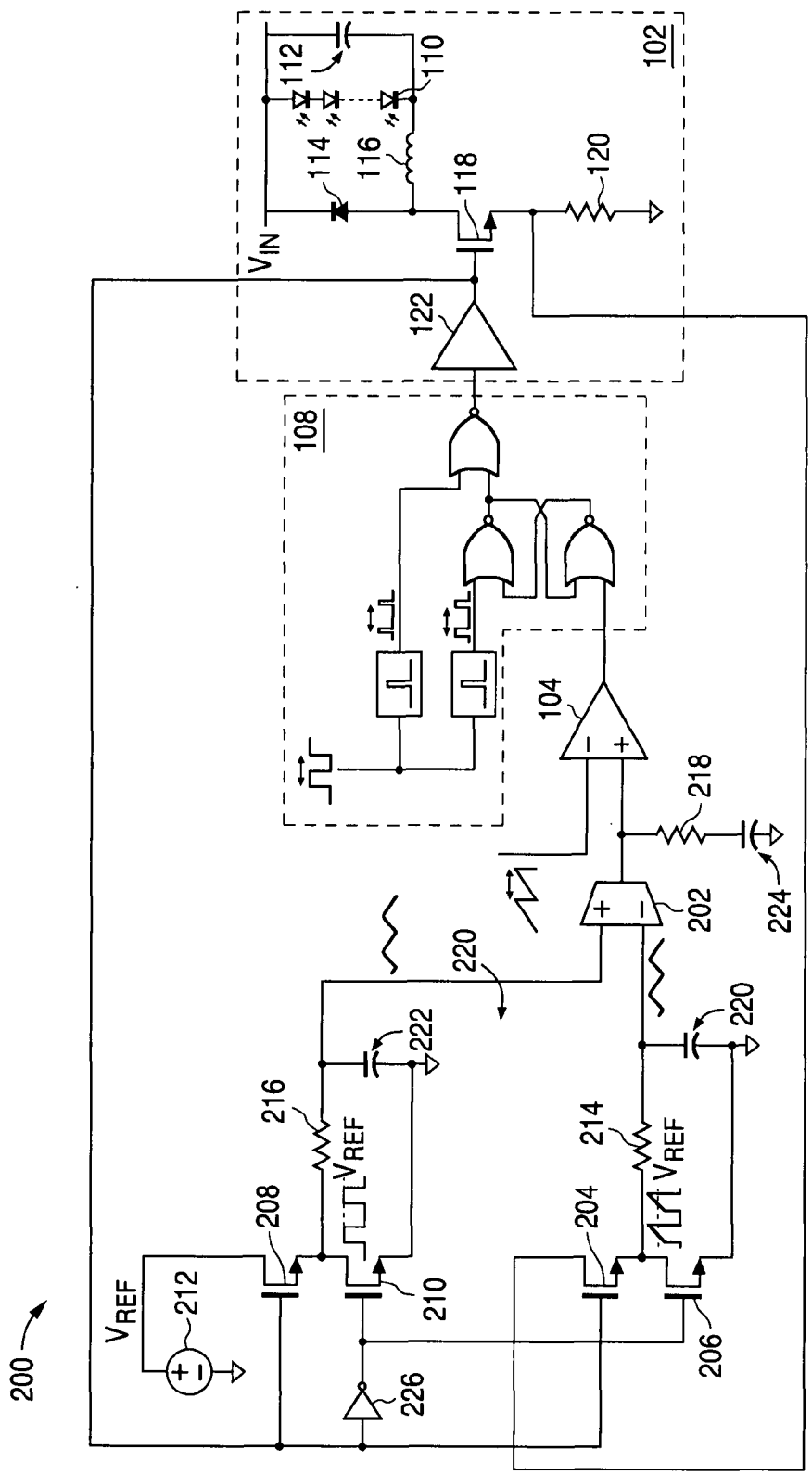
Figure 5:
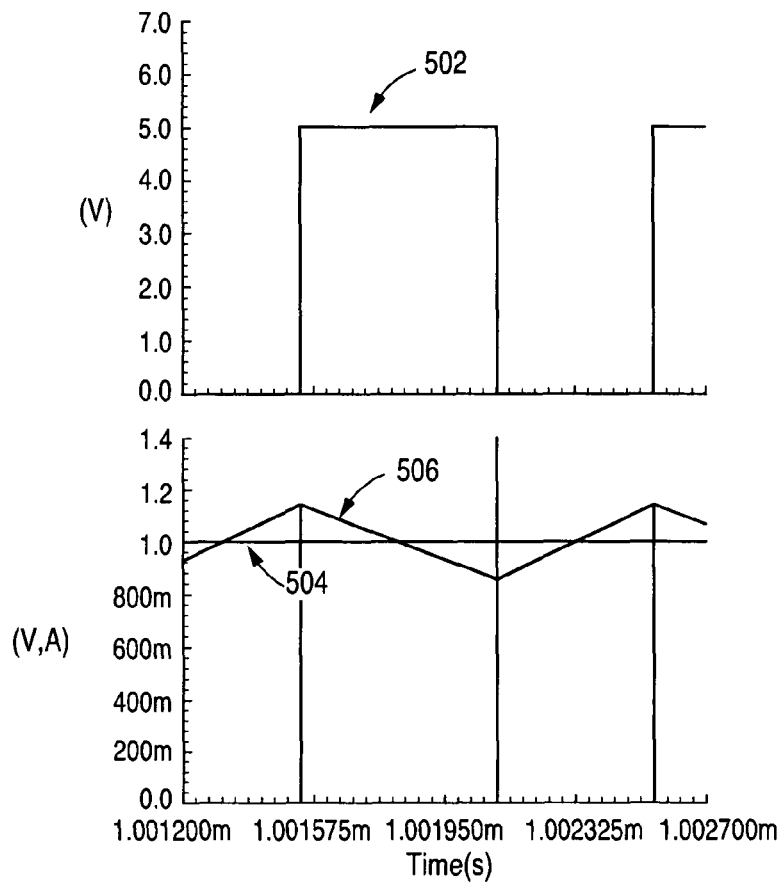
Figure 6:
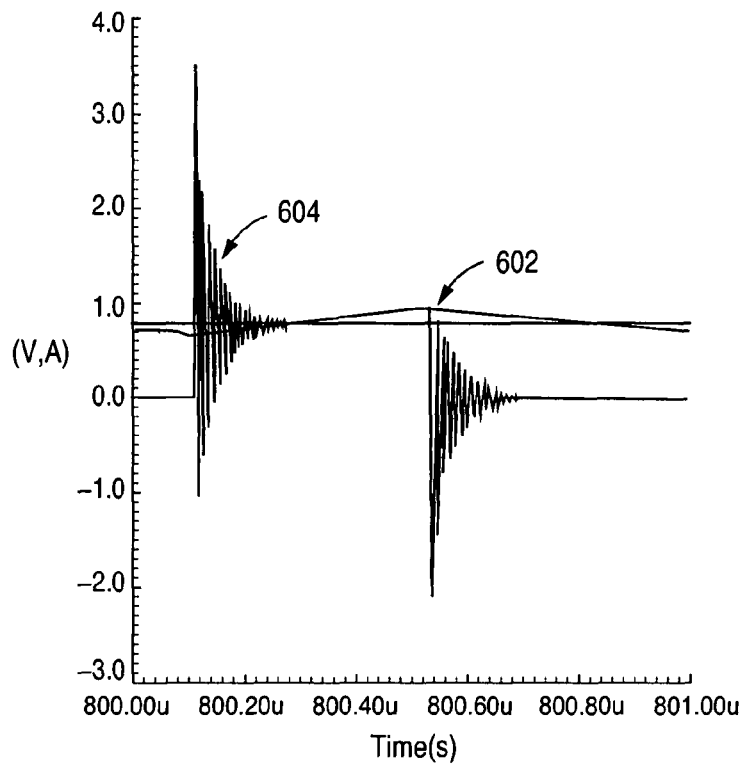

FIGS. 4 through 6 illustrate example operating characteristics of the regulator 300 shown in FIG. 3. The operating characteristics of the regulator 300 shown in FIGS. 4 through 6 are for illustration and explanation only. The regulator 300 could operate in any other or additional manner without departing from the scope of this disclosure.

FIG. 4 represents simulation results obtained using the regulator 300 when the LEDs 302 are turned on and the inductor current ramps up towards its specific voltage. In FIG. 4, line 402 represents the reference voltage $V_{REF}$ produced by the voltage source 314. In this example, the reference voltage $V_{REF}$ increases from 0V to 1V within 1 ms. Line 404 represents the current through the inductor 308, which shows a corresponding increase from 0 A to 1 A in approximately the same time period. In other words, the average inductor current tracks the reference voltage $V_{REF}$.

FIG. 5 illustrates the operation of the regulator 300 during one cycle. Line 502 in FIG. 5 represents the operation of the error amplifier 316, where the error amplifier 316 is turned on when the signal represented by line 502 is at 5V and turned off when the signal is at 0V. Line 504 represents the reference voltage $V_{REF}$, and line 506 represents the sensed voltage SEN and the inductor current. The reference voltage $V_{REF}$ is generally constant at 1V. The sensed voltage SEN and the inductor current approximately match and increase/decrease together. In this example, the sensed voltage SEN follows the inductor current during ramp up (when the transistor 328 is on) and falls to ground during ramp down (when the transistor 328 is off). However, the average inductor current stays close to $V_{REF}$. As shown here, the regulator 300 is able to control the average current through the LEDs 302.

FIG. 6 illustrates the operation of the regulator 300 during one cycle in a similar way as is done in FIG. 5. In FIG. 6, a parasitic inductance of 20 nH has been placed in series with the resistor 312. Line 602 represents the reference voltage $V_{REF}$, and line 604 represents the inductor current and the sensed voltage SEN. This shows the regulator 300 may operate properly even in the presence of parasitic elements.

Although FIGS. 4 through 6 illustrate examples of the operating characteristics of the regulator 300 shown in FIG. 3, various changes may be made to FIGS. 4 through 6. For example, the regulator 300 could operate in any other or additional manner. The graphs shown in FIGS. 4 through 6 are simply provided for illustration and explanation only and do not limit the operations that could be performed by the regulator 300.

In some embodiments, various functions described above can be implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases that have been used within this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention as defined by the following claims.

What is claimed is:

1. A regulator, comprising:
  a transistor switch operable to couple one or more light emitting diodes (LEDs) to ground, the transistor switch coupled to a resistor; and
  circuitry operable to control the transistor switch, the circuitry operable to use a substantially constant reference voltage to regulate an average current through the one or more LEDs, wherein the circuitry comprises:
    an error amplifier operable to compare the substantially constant reference voltage and a voltage across the resistor, wherein the error amplifier is disabled for a period of time when the transistor switch is non-conductive; and
    logic operable to enable and disable the error amplifier.

2. The regulator of claim 1, wherein:
the error amplifier is enabled after the transistor switch becomes conductive; and
the error amplifier is disabled before the transistor switch becomes non-conductive.

3. The regulator of claim 1, wherein the average current through the one or more LEDs tracks the substantially constant reference voltage.

4. The regulator of claim 1, wherein the circuitry further comprises:
a pulse width modulator operable to receive (i) a first input based on an output of the error amplifier and (ii) a second input comprising a second reference voltage; and
a gate driver operable to drive a gate of the transistor switch based on an output of the pulse width modulator.

5. The regulator of claim 4, wherein the logic comprises:
a first inverter having an input coupled to an output of the gate driver;
a second inverter having an input coupled to an output of the first inverter;
an AND gate having (i) a first input coupled to an output of the second inverter and (ii) a second input coupled to the output of the pulse width modulator; and
a NOR gate having (i) a first input coupled to an output of the AND gate, (ii) a second input operable to receive a clock signal, and (iii) an output operable to provide a supply voltage to the error amplifier.

6. The regulator of claim 5, wherein the clock signal causes the NOR gate to enable the error amplifier even when a duty cycle of the output of the pulse width modulator is zero.

7. A regulator, comprising:
a transistor switch operable to couple one or more light emitting diodes (LEDs) to ground, the transistor switch coupled to a resistor; and
circuitry operable to control the transistor switch, the circuitry operable to use a substantially constant reference voltage to regulate an average current through the one or more LEDs, wherein the circuitry comprises:
an error amplifier operable to compare the substantially constant reference voltage to a voltage across the resistor;
a pulse width modulator operable to receive (i) a first input based on an output of the error amplifier and (ii) a second input comprising a second reference voltage; and
a gate driver operable to drive a gate of the transistor switch based on an output of the pulse width modulator;
wherein:
the substantially constant reference voltage ramps from an initial value to a substantially constant higher value; and
the second reference voltage comprises a sawtooth voltage.

8. A circuit, comprising:
one or more light emitting diodes (LEDs); and
a regulator operable to use a substantially constant reference voltage to regulate an average current through the one or more LEDs, wherein the regulator comprises:
a transistor switch operable to couple the one or more LEDs to ground, the transistor switch coupled to a resistor; and
circuitry operable to control the transistor switch so as to regulate the average current through the one or more LEDs, wherein the circuitry comprises:
an error amplifier operable to compare the substantially constant reference voltage to a voltage across the resistor, wherein the error amplifier is disabled for a period of time when the transistor switch is non-conductive; and
logic operable to enable and disable the error amplifier.

9. The circuit of claim 8, wherein:
the error amplifier is enabled after the transistor switch becomes conductive; and
the error amplifier is disabled before the transistor switch becomes non-conductive.

10. The circuit of claim 8, further comprising:
a diode coupled in parallel with the one or more LEDs;
a capacitor coupled in parallel with the one or more LEDs;
an inductor coupled between the one or more LEDs and the diode, the inductor also coupled to the regulator; and
a voltage source operable to provide an input voltage to the one or more LEDs and the capacitor.

11. The circuit of claim 8, wherein the circuitry further comprises:
a pulse width modulator operable to receive (i) a first input based on an output of the error amplifier and (ii) a second input comprising a second reference voltage; and
a gate driver operable to drive a gate of the transistor switch based on an output of the pulse width modulator.

12. The circuit of claim 11, wherein:
the substantially constant reference voltage ramps from an initial value to a substantially constant higher value; and
the second reference voltage comprises a sawtooth voltage.

13. The circuit of claim 11, wherein the logic comprises:
a first inverter having an input coupled to an output of the gate driver;
a second inverter having an input coupled to an output of the first inverter;
an AND gate having (i) a first input coupled to an output of the second inverter and (ii) a second input coupled to the output of the pulse width modulator; and
a NOR gate having (i) a first input coupled to an output of the AND gate, (ii) a second input operable to receive a clock signal, and (iii) an output operable to provide a supply voltage to the error amplifier.

14. The circuit of claim 13, wherein the clock signal causes the NOR gate to enable the error amplifier even when a duty cycle of the output of the pulse width modulator is zero.

15. A method, comprising:
coupling one or more light emitting diodes (LEDs) to ground using a transistor switch, the transistor switch coupled to a resistor; and
regulating an average current through the one or more LEDs by controlling the transistor switch using a substantially constant reference voltage, wherein regulating the average current comprises:
comparing the substantially constant reference voltage to a voltage across the resistor using an error amplifier; and
enabling and disabling the error amplifier, wherein the error amplifier is enabled after the transistor switch becomes conductive and disabled before the transistor switch becomes non-conductive.

16. The method of claim 15, wherein the error amplifier is disabled for a period of time when the transistor switch is non-conductive.

17. The method of claim 15, wherein coupling the one or more LEDs to ground using the transistor switch comprises generating a pulse width modulation (PWM) signal using a pulse width modulator.

18. The method of claim 17, further comprising:
enabling the error amplifier even when a duty cycle of the PWM signal is zero.

19. The method of claim 17, wherein:
- the pulse width modulator receives a second reference voltage;
- the substantially constant reference voltage ramps from an initial value to a substantially constant higher value; and
- the second reference voltage comprises a sawtooth voltage.

20. The method of claim 17, wherein enabling and disabling the error amplifier comprises using logic that includes:
- a first inverter having an input coupled to an output of a gate driver, the gate driver driving a gate of the transistor switch;
- a second inverter having an input coupled to an output of the first inverter;
- an AND gate having (i) a first input coupled to an output of the second inverter and (ii) a second input coupled to the output of the pulse width modulator; and
- a NOR gate having (i) a first input coupled to an output of the AND gate, (ii) a second input operable to receive a clock signal, and (iii) an output operable to provide a supply voltage to the error amplifier.

* * * * *